ated June 27, 1961

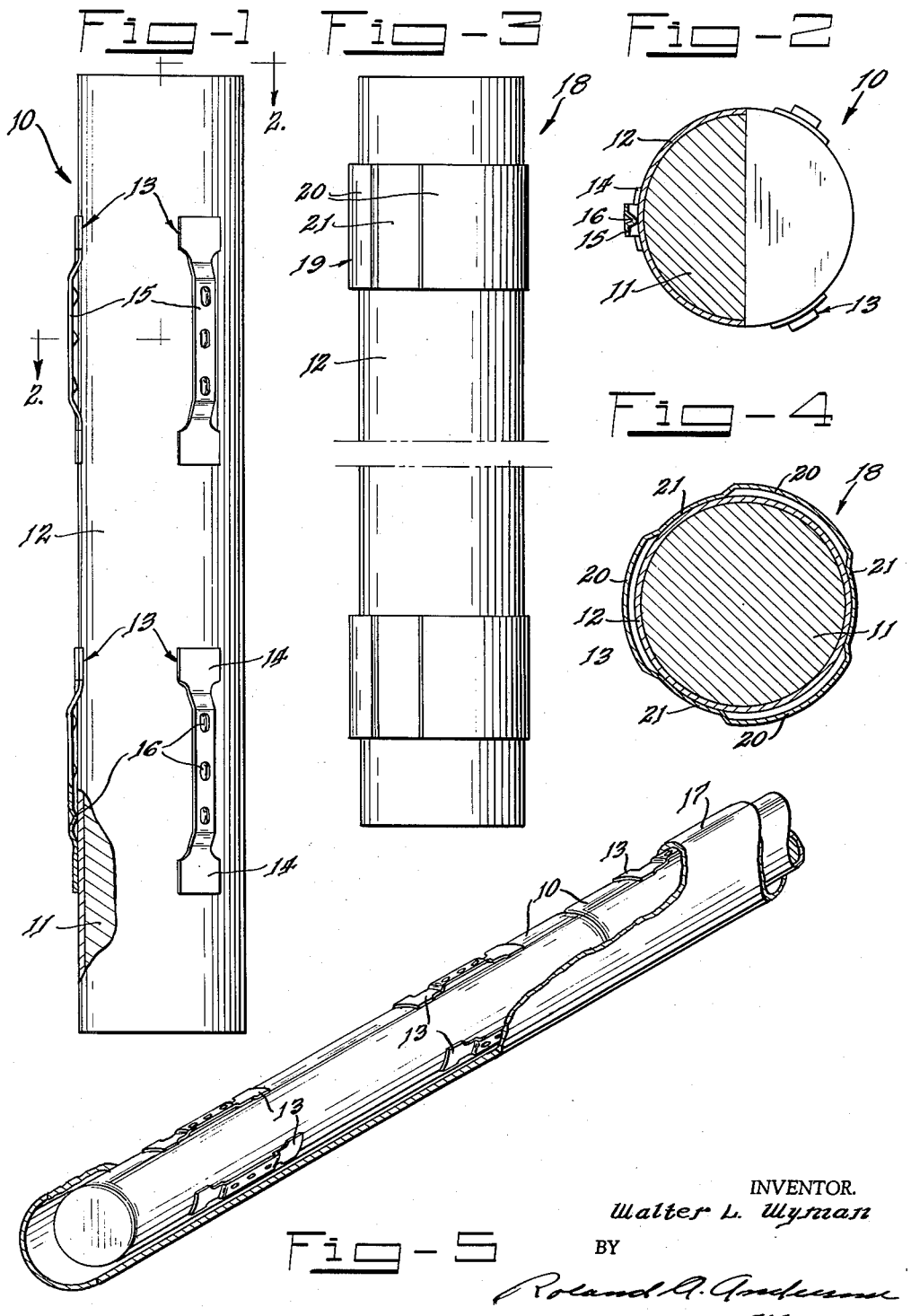

2,990,359
FUEL ELEMENT SUPPORT
Walter L. Wyman, Richland, Wash., assignor to the United States of America as represented by the United States Atomic Energy Commission
Filed Dec. 19, 1958, Ser. No. 781,819
2 Claims. (Cl. 204—193.2)

This invention relates to an arrangement for supporting nuclear-fuel elements and, more particularly, to the manner of supporting such elements in a tube through which coolant flows to remove heat generated by the elements.

Reference is made to Fermi et al. Patent 2,708,656, dated May 17, 1955, and Wigner et al. Patent 2,736,696, dated February 28, 1956, for a complete disclosure of a nuclear reactor of the type to which the present invention may be applied. According to FIG. 39 and column 43 of the Fermi et al. patent, a fuel element is supported in a coolant tube on four longitudinal ribs therein distributed about the fuel element. It is difficult to remove a fuel element supported in this way when it expands or ruptures because of reactor operation. Moreover, a ruptured fuel element may damage the coolant tube before the ruptured element can be located and removed. Thus it is the practice, in some instances, to support a fuel element on two longitudinal ribs in the bottom of a coolant tube, as shown in FIG. 3 of Metcalf et al. Patent 2,741,593, dated April 10, 1956, so that room for expansion or rupture of the fuel element due to reactor operation is provided. The drawback here is that expansion or rupture of the fuel element reduces the thickness of the space between the fuel element and the top of the coolant tube, so that insufficient or uneven cooling of the fuel element may result.

An object of the present invention is to provide a fuel element so constructed as to be effectively cooled in a coolant tube in spite of growth and yet easily removed from the coolant tube.

According to the present invention, a fuel element is provided with longitudinally spaced sets of short longitudinal collapsible ribs circumferentially spaced from one another about the fuel element. Since the ribs are distributed about the fuel element, expansion thereof will not affect the uniformity of the annular space between the fuel element and the coolant tube. Since the ribs are yielding, expansion of the fuel element is unlikely to make it become jammed in the coolant tube.

Other objects will appear from the description and drawings in which:

FIG. 1 is an elevational view, partly in section, of a first form of the fuel element of the present invention;
FIG. 2 is a view taken on the line 2—2 of FIG. 1;
FIG. 3 is an elevational view of a second form of the fuel element of the present invention;
FIG. 4 is a sectional view taken on line 4—4 of FIG. 3; and
FIG. 5 is a perspective view, with parts broken away, of a coolant tube and a plurality of the fuel elements of FIG. 1 positioned therein.

In FIGS. 1 and 2, a nuclear-fuel element 10 comprises a fissionable core 11 and a corrosion-resistant jacket 12 enclosing the core 11. The fuel element 10 includes, as a novel and patentable feature, a plurality of radially collapsible ribs 13 attached to the jacket 12 and distributed thereabout in circumferentially spaced relationship.

The fissionable core 11 is circular and cylindrical and is formed of material containing an isotope fissionable by thermal neutrons, such as $U^{235}$, $U^{233}$, and $Pu^{239}$. The corrosion-resistant jacket 12 is formed of a material having low neutron-absorbent characteristics, such as aluminum or its alloys or zirconium or its alloys. The dimensions of the core 11 and jacket may be those specified in column 44 of the aforementioned Fermi et al. patent.

The ribs 13 are formed of any of the materials specified for the jacket 12. There are two longitudinally spaced sets of ribs 13, each set comprising three ribs equally circumferentially spaced from one another about the jacket 12. Each rib 13 of each set extends longitudinally of the fuel element 10 and is at least in general alignment with a rib 13 of the other set.

Each rib 13 has relatively wide end portions 14, a relatively narrow intermediate portion 15 connecting end portions 14, and three dimples or depressions 16 distributed along the intermediate portion 15 in spaced relationship to one another. The end portions 14 of the rib 13 are attached to the jacket 12 by welding or soldering. The intermediate portion 15 is offset from the end portions 14 and so is radially spaced from the jacket 12 except for the dimples 16 which engage the jacket 12 without being attached thereto.

In reactor operation, the fuel elements 10 are positioned end to end, as shown in FIG. 5, in a coolant or process tube 17, which is free of internal ribs. The intermediate portions 15 of the ribs 13 are spaced from the jackets 12 so as to engage the interior of the coolant tube 17 on all sides and so support the fuel elements 10 so that a uniform annular space is provided between the fuel elements 10 and the coolant tube 17, which space is sufficient for the flow of water or coolant through the tube 17 and over the fuel elements 10. The ribs 13, or more particularly, the intermediate portions 15 thereof, are radially collapsible if the fuel element 10 expands with or without rupturing, as a result of reactor operation, so that a minimum of damage to the coolant tube 17 results. Yet the ribs 13 are sufficiently strong as to withstand the normal forces involved in inserting or supporting of the fuel elements 10 in the coolant tube 17 during the operating cycle in the reactor. If the fuel element 10 ruptures, the collapsibility of the ribs 13 allows more time to determine that a rupture has occurred before excessive forces that can cause coolant-tube damage are generated in the rupture region. The collapsibility of the ribs 13 improves the discharge characteristics of the ruptured fuel elements and permits discharging them with lower force and less damage to the coolant tube 17.

In FIGS. 3 and 4, a nuclear-fuel element 18 has a core 11 and a jacket 12 similar to those of the nuclear-fuel element 10 of FIGS. 1 and 2. However, the fuel element 18 is supported in the coolant tube 17 by two wide rings 19 which are spaced from one another longitudinally of the fuel element 18. Each ring 19 comprises three equally spaced portions 20, which are distributed about the jacket 12 and are radially spaced therefrom, and three portions 21, which interconnect the portions 20 and tightly engage the jacket 12, being attached thereto by welding or soldering. The portions 20 are relatively short, and the portions 21, relatively long, when considered in a peripheral direction. Each portion 20 of each ring 19 is longitudinally alined with a portion 20 of the other ring 19. The portions 20 of the two rings 19 constitute two longitudinally spaced sets of short longitudinal, radially collapsible, circumferentially spaced ribs on the jacket 12, each set of ribs being three in number. The rings 19 are formed of any of the materials specified for the jacket 12.

The invention is to limit the invention only within the scope of the appended claims.

What is claimed is:
1. A nuclear-fuel element comprising a fissionable core, a corrosion-resistant jacket enclosing the core, and two longitudinally spaced sets of short longitudinal radially collapsible corrosion-resistant ribs circumferen- tially spaced from one another about the jacket, each rib having its end portions bonded to the jacket and regions intermediate its end portions spaced from the jacket.

2. The nuclear-fuel element specified in claim 1, the said regions of each rib intermediate its end portions being provided with dimples spaced lengthwise of the rib and engaging the jacket.

References Cited in the file of this patent

UNITED STATES PATENTS

| | | |
|---|---|---|
| 2,877,170 | Greenhalgh et al. | Mar. 10, 1959 |
| 2,890,158 | Ohlinger et al. | June 9, 1959 |

FOREIGN PATENTS

| | | |
|---|---|---|
| 784,890 | Great Britain | Oct. 16, 1957 |